June 14, 1960     E. J. SCHAAP     2,940,531
TONGUE FOR FARM IMPLEMENT
Filed Oct. 19, 1956     2 Sheets-Sheet 1
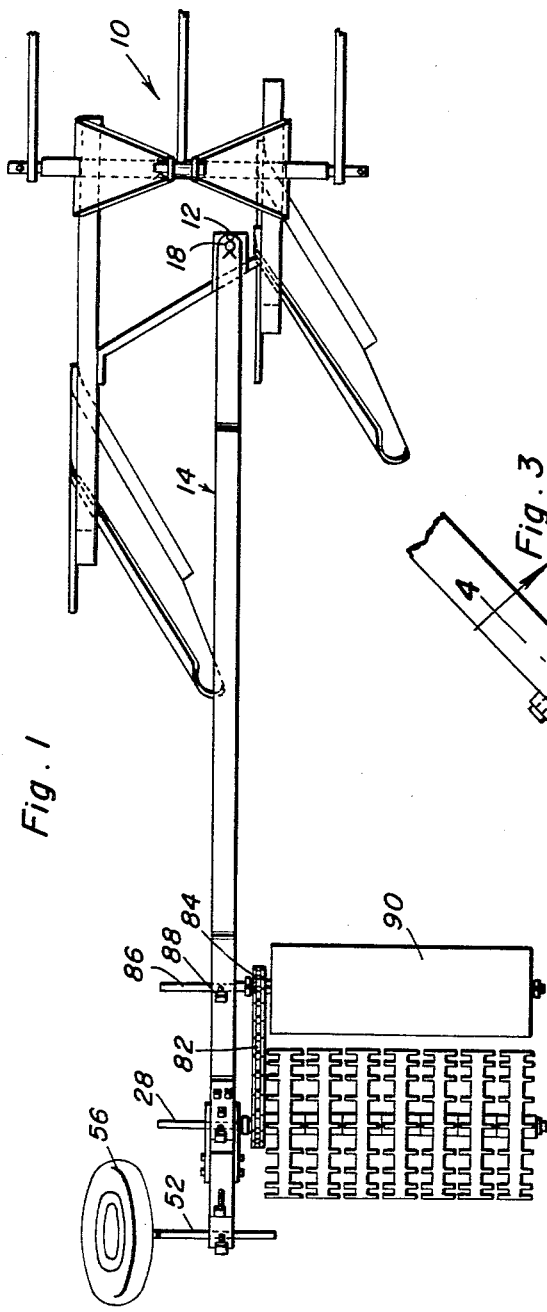
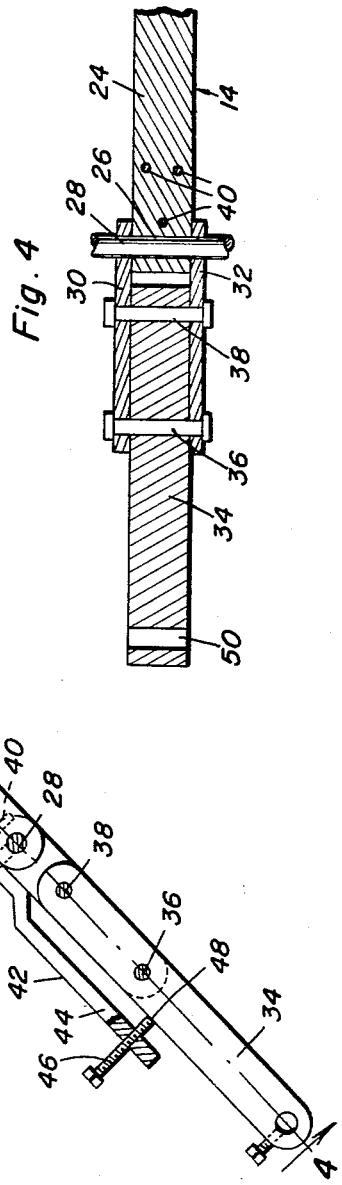
Emerson J. Schaap
INVENTOR.

June 14, 1960 E. J. SCHAAP 2,940,531
TONGUE FOR FARM IMPLEMENT
Filed Oct. 19, 1956 2 Sheets-Sheet 2
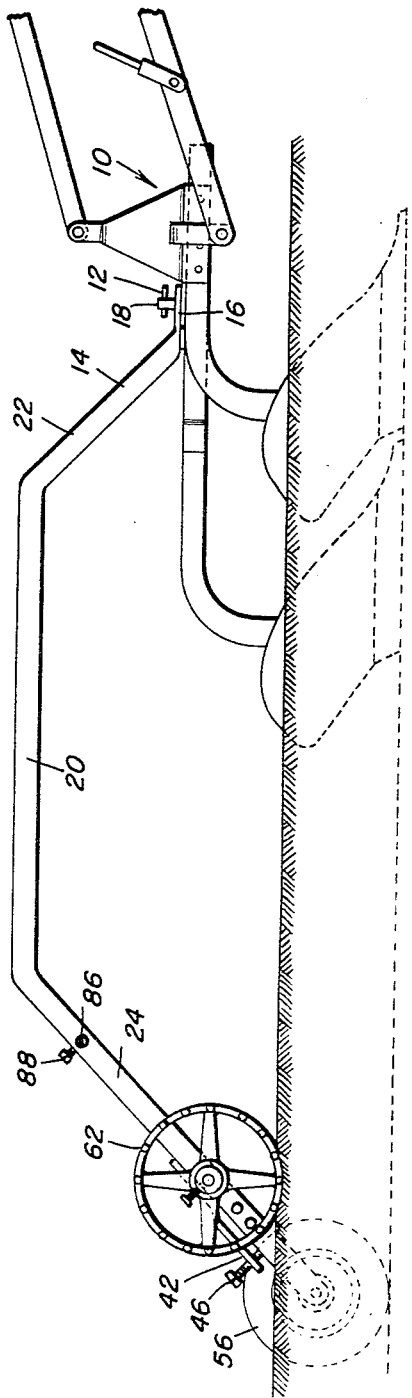
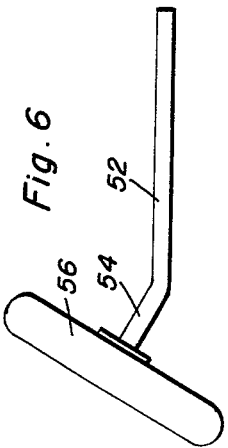
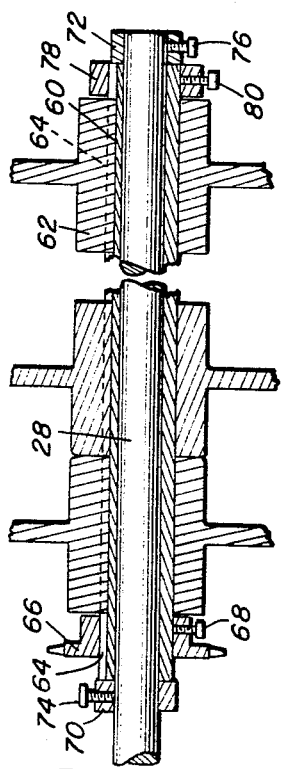
Emerson J. Schaap
INVENTOR.

United States Patent Office 2,940,531
Patented June 14, 1960

2,940,531

TONGUE FOR FARM IMPLEMENT

Emerson J. Schaap, R.R. 1, Hamilton, Mich.

Filed Oct. 19, 1956, Ser. No. 617,033

7 Claims. (Cl. 172—26)

This invention relates to an attachment for a plow or other similar farm implement and more particularly to a device adapted to be pulled behind a plow attached to a tractor.

The primary object of the present invention resides in an attachment for a plow for packing the earth behind the plow and which employs a novel furrow guide wheel for reducing landslide pressure on the plow while permitting very short and tight turns to be made by the tractor.

A further object of the present invention resides in an attachment for a tractor which is designed for attachment to nearly all types of plows that are utilized as trailers for a tractor and which will add traction to the tractor having the mounted plows mounted therebehind.

One of the features of the invention resides in the arrangement of parts of a novel furrow guide wheel which is mounted on a link pivoted to an arch or beam and adjustably maintained in an adjusted limiting position with respect to the arch forming the tongue for the implement. Incorporated in the invention is a novel means for driving a fertilizer or seed feeding attachment for the device so that the single operation of the attachment will enable ground to be plowed, fertilized and seeded.

Still further objects and features of this invention reside in the provision of an attachment for a farm implement that is simple in construction, easy to attach to various types of farm implements, and which is inexpensive to manufacture thereby permitting wide use and distribution and relatively low cost to the farmer.

These, together with the various ancillary objects and features of the invention which will become apparent as the following description proceeds, are attained by this attachment for a farm implement, a preferred embodiment of which has been illustrated in the accompanying drawings, by way of example only, wherein:

Fig. 1 is a plan view of the invention;

Fig. 2 is a side elevational view of the invention with portions thereof being shown in section or detail;

Fig. 3 is an enlarged sectional detailed view of an end portion of the arch and of the link construction;

Fig. 4 is a sectional detailed view on an enlarged scale taken along the line of 4—4 in Fig. 3;

Fig. 5 is a sectional detailed view of a portion of the packer wheel assembly;

Fig. 6 is a elevational view of the furrow guide wheel utilizing the present invention.

With continuous reference to the accompanying drawings wherein like reference numerals designate similar parts throughout the various views, reference numeral 10 is used to generally designate a conventional plow which is designed to be pulled behind a tractor as a trailer. By means of a lock pin 12 the arch or beam 14 which has a mounting bracket 16 which is apertured for fitting over a stud 18 is held in place on the frame or other portion of plow 10. The arch 14 includes a generally horizontally extending central portion 20 as well as a downwardly extending forward portion 22 and a rear portion 24 which extends downwardly and rearwardly. As can be seen best in Figs. 3 and 4, the downwardly and rearwardly extending portion 24 is apertured as at 26 for reception of shaft 28 which not only extends through the aperture 26 but also extends through plates 30 and 32 bolted or otherwise secured to a link 34 by means of fasteners 36 and 38. Thus the shaft 28 forms a pivotal connection between the link 34 and the arch 14. The arch 14 has secured thereto by means of screws or other suitable fasteners as are indicated at 40 an adjusting plate 42 having an offset portion 44 which carries a threaded adjusting member 46 in the form of a screw or the like which is adapted to have its end 48 engage the link 34 to hold the link in a selected position. This position is a limited position for the link 34, it being recognized that the link can pivot in a direction when looking at Fig 3 in a counter clockwise direction. However, a shaft extends through a bore or aperture 50 in the link 34, the shaft being designated by reference numeral 52 and seen best in its construction in Figs. 1 and 6. This shaft has an angulated end portion 54 which carries a wheel 56 journaled thereon which wheel 56 is adapted to be engaged in a furrow against the land side thereof and reduce land side pressure on the plow. Of course, by determining the position of the shaft within the link 34, the wheel 56 can toe in or out as may be desired.

Mounted on the shaft 28 is a roller or tube 60 which has a plurality of packer wheel elements 62 keyed thereto by means of a spline or key 64. A sprocket wheel 66 is also keyed by means of the spline 64 to the roller 60. The position of the sprocket 66 may be adjusted by means of a set screw 68 which holds the sprocket 66 rigidly in place and a pair of collars 70 and 72 having set screw 74 and 76 are provided for adjustably holding the packer wheel element 62 in a selected position. A further collar 78 may be provided for lockingly holding spline or key 64 in position, the spline or key fitting in a keyway in the collar 78 with the collar 78 being held by a set screw 80 to the roller or tube 60. The packer wheel element 62 may be of any suitable and conventional construction. And trained over the sprocket 66 is an endless chain 82 which is trained about a driven sprocket 84 mounted on a shaft 86 held by means of a set screw 88 in position as may be selected with respect to the arch 14. The sprocket 86 forms a portion of a conventional fertilizer and seed depositor assembly 90.

The operation of the invention is quite apparent. The arch 14 is pulled directly behind the plow 10 with the furrow guide wheel 56 riding in a furrow to hold the packer wheel assembly in desired alignment. The furrow is of course produced by the plow blade directly in front of the guide wheel 56. Inasmuch as the arch 14 is pivoted to the plow the packer wheel assembly will still be guided over the other furrows to pack the earth properly.

The fertilizer-seed attachment will drop fertilizer and seed into position directly in front of the packer wheels when such is utilized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a plow comprising a beam, means pivotally connecting said beam to a plow for free swinging movement in a horizontal plane from one side of a plow to the other, a link having one end pivoted to the rear portion of said beam for movement about a transversely extending horizontal axis, means for adjustably limiting the pivotal movement of the link with respect to said beam including an adjusting plate secured to said beam and having an offset portion overlying said link, a threaded adjusting member threadedly and adjustably secured in said offset portion engaging said link, a packer wheel assembly including a first shaft secured to said beam, a second shaft adjustably and pivotally secured to the other end of said link for pivotal movement about a horizontal axis, and a furrow guide wheel mounted on said second shaft spaced laterally of said packer wheel assembly whereby the furrow guide wheel engages the land side of the furrow and so positions said beam to guide said packer wheel assembly over the freshly turned soil.

2. An attachment for a plow comprising a beam, means pivotally connecting said beam to a plow for free swinging movement in a horizontal plane from one side of a plow to the other, a link having one end pivoted to the rear portion of said beam for movement about a transversely extending horizontal axis, means for adjustably limiting the pivotal movement of the link with respect to said beam including an adjusting plate secured to said beam and having an offset portion overlying said link, a threaded adjusting member threadedly and adjustably secured in said offset portion engaging said link, a packer wheel assembly including a first shaft secured to said beam, a second shaft adjustably and pivotally secured to the other end of said link for pivotal movement about a horizontal axis, and a furrow guide wheel mounted on said second shaft spaced laterally of said packer wheel assembly whereby the furrow guide wheel engages the land side of the furrow and so positions said beam to guide said packer wheel assembly over the freshly turned soil, said first shaft being longitudinally adjustable with respect to said beam, said packer wheel assembly including a plurality of packer elements adjustably positioned on said first shaft.

3. The combination of claim 2 wherein said second shaft has an angle therein intermediate said link and said guide wheel whereby the toe-in or toe-out of said wheel may be effected by the rotation of said axle in said link about its axis.

4. The combination of claim 1 wherein said first shaft is longitudinally adjustable with respect to said beam.

5. An attachment for a plow comprising a beam, means pivotally connecting one end of said beam to a plow for movement about a vertical axis, a packer wheel assembly journaled on the other end of said beam, and a furrow guide wheel journaled on said other end of said beam spaced laterally and positioned vertically from said packer wheel assembly and adapted to engage the land side of the furrow and so position said beam with respect to said furrow to guide said packer wheel assembly over the freshly turned soil.

6. The combination of claim 5 wherein said packer wheel assembly is laterally adjustable with respect to said beam.

7. The combination of claim 5 wherein said furrow guide wheel includes a transversely extending supporting axle secured to said beam, means for longitudinally and rotatably adjusting said axle relative to said beam, a furrow wheel rotatably journaled on said axle, said axle having an angle therein intermediate said beam and said guide wheel whereby the toe-in or toe-out of said wheel may be effected by rotation of said axle about its axis adjacent said beam.

References Cited in the file of this patent

UNITED STATES PATENTS

| | | |
|---|---|---|
| 941,740 | Stelzer | Nov. 30, 1909 |
| 1,074,208 | Rowley | Sept. 30, 1913 |
| 1,463,243 | Bley | July 31, 1923 |
| 1,552,306 | Indorf | Sept. 1, 1925 |
| 1,679,628 | Roby | Aug. 7, 1928 |
| 2,330,302 | Morkoski | Sept. 28, 1943 |
| 2,615,291 | McCleneghan | Oct. 28, 1952 |